US012399652B2

(12) United States Patent
Ootomo et al.

(10) Patent No.: US 12,399,652 B2
(45) Date of Patent: Aug. 26, 2025

(54) MEMORY MULTICHIP PACKAGE EMPLOYING A FREQUENCY MULTIPLYING BRIDGE CHIP

(71) Applicant: Kioxia Corporation, Tokyo (JP)

(72) Inventors: Goichi Ootomo, Kawasaki Kanagawa (JP); Tomoaki Suzuki, Chigasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 15 days.

(21) Appl. No.: 18/584,575

(22) Filed: Feb. 22, 2024

(65) Prior Publication Data

US 2024/0311051 A1    Sep. 19, 2024

(30) Foreign Application Priority Data

Mar. 17, 2023  (JP) ................. 2023-043425

(51) Int. Cl.
*G06F 3/06* (2006.01)
(52) U.S. Cl.
CPC .......... *G06F 3/0659* (2013.01); *G06F 3/0613* (2013.01); *G06F 3/0679* (2013.01)
(58) Field of Classification Search
CPC ..... G06F 3/0659; G06F 3/0613; G06F 3/0679
See application file for complete search history.

(56) References Cited

U.S. PATENT DOCUMENTS

| | | | |
|---|---|---|---|
| 11,372,786 B2 | 6/2022 | Ootomo et al. | |
| 11,544,209 B2 | 1/2023 | Ootomo et al. | |
| 2004/0236894 A1* | 11/2004 | Grundy | G06F 13/1684 |
| | | | 711/1 |
| 2013/0326090 A1 | 12/2013 | Gillingham | |
| 2015/0254009 A1* | 9/2015 | Eguchi | G06F 3/0661 |
| | | | 711/147 |
| 2019/0095099 A1* | 3/2019 | Canepa | G06F 3/0659 |
| 2019/0114276 A1* | 4/2019 | Hodes | G06F 13/4027 |
| 2021/0294521 A1* | 9/2021 | Suzuki | G06F 3/061 |
| 2022/0019536 A1* | 1/2022 | Narsale | G06F 12/0862 |
| 2022/0083482 A1* | 3/2022 | Ootomo | G06F 13/1689 |
| 2024/0028244 A1* | 1/2024 | Weinberg | G06F 3/0679 |

FOREIGN PATENT DOCUMENTS

| | | |
|---|---|---|
| JP | 2015520459 A | 7/2015 |
| JP | 2022049453 A | 3/2022 |
| JP | 2022146543 A | 10/2022 |

* cited by examiner

*Primary Examiner* — Tracy A Warren
(74) *Attorney, Agent, or Firm* — Kim & Stewart LLP

(57) ABSTRACT

A semiconductor device includes a first interface with a first channel at a first data transfer rate, a second interface with a second channel at a second data transfer rate slower than the first data transfer rate, a transfer circuit, and a processor. The processor is configured to, upon the first interface receiving a first data output command from a memory controller via the first channel, issue the first data output command via the second channel, in response to which a first memory chip connected to the second interface reads first data corresponding to the first data output command, and after a first predetermined amount of time has elapsed from the issuance of the first data output command, issue a first transfer start command via the second channel, in response to which the first data is transferred to the transfer circuit via the second channel.

20 Claims, 9 Drawing Sheets

MEMORY MULTICHIP PACKAGE EMPLOYING A FREQUENCY MULTIPLYING BRIDGE CHIP

CROSS-REFERENCE TO RELATED APPLICATION

This application is based upon and claims the benefit of priority from Japanese Patent Application No. 2023-043425, filed on Mar. 17, 2023, the entire contents of which are incorporated herein by reference.

FIELD

Embodiments described herein relate generally to a semiconductor device, a semiconductor storage device, and a memory system.

BACKGROUND

There is a semiconductor storage device in which a semiconductor device called a bridge chip is disposed between an external terminal group connected to an external controller (hereinafter denoted as a memory controller) and a group of memory chips. In this semiconductor storage device, data transfer between the memory controller and the plurality of memory chips is performed via the bridge chip.

DETAILED DESCRIPTION

Embodiments provide a semiconductor device, a semiconductor storage device, and a memory system capable of improving data transfer efficiency.

In general, according to an embodiment, a semiconductor device includes a first interface with a first channel through which data is to be transferred at a first data transfer rate, a second interface with a second channel through which data is to be transferred at a second data transfer rate slower than the first data transfer rate, a transfer circuit, and a processor. The processor is configured to, in response to the first interface receiving a first data output command from a memory controller via the first channel, issue the first data output command for transmission via the second channel, in response to which a first memory chip connected to the second interface reads first data corresponding to the first data output command, and after a first predetermined amount of time has elapsed from the issuance of the first data output command, issue a first transfer start command via the second channel, in response to which the first data is transferred to the transfer circuit via the second channel.

Hereinafter, a semiconductor device, a semiconductor storage device, and a memory system according to embodiments will be described in detail with reference to the accompanying drawings. The present disclosure is not limited to these embodiments.

First Embodiment

Figure 1:
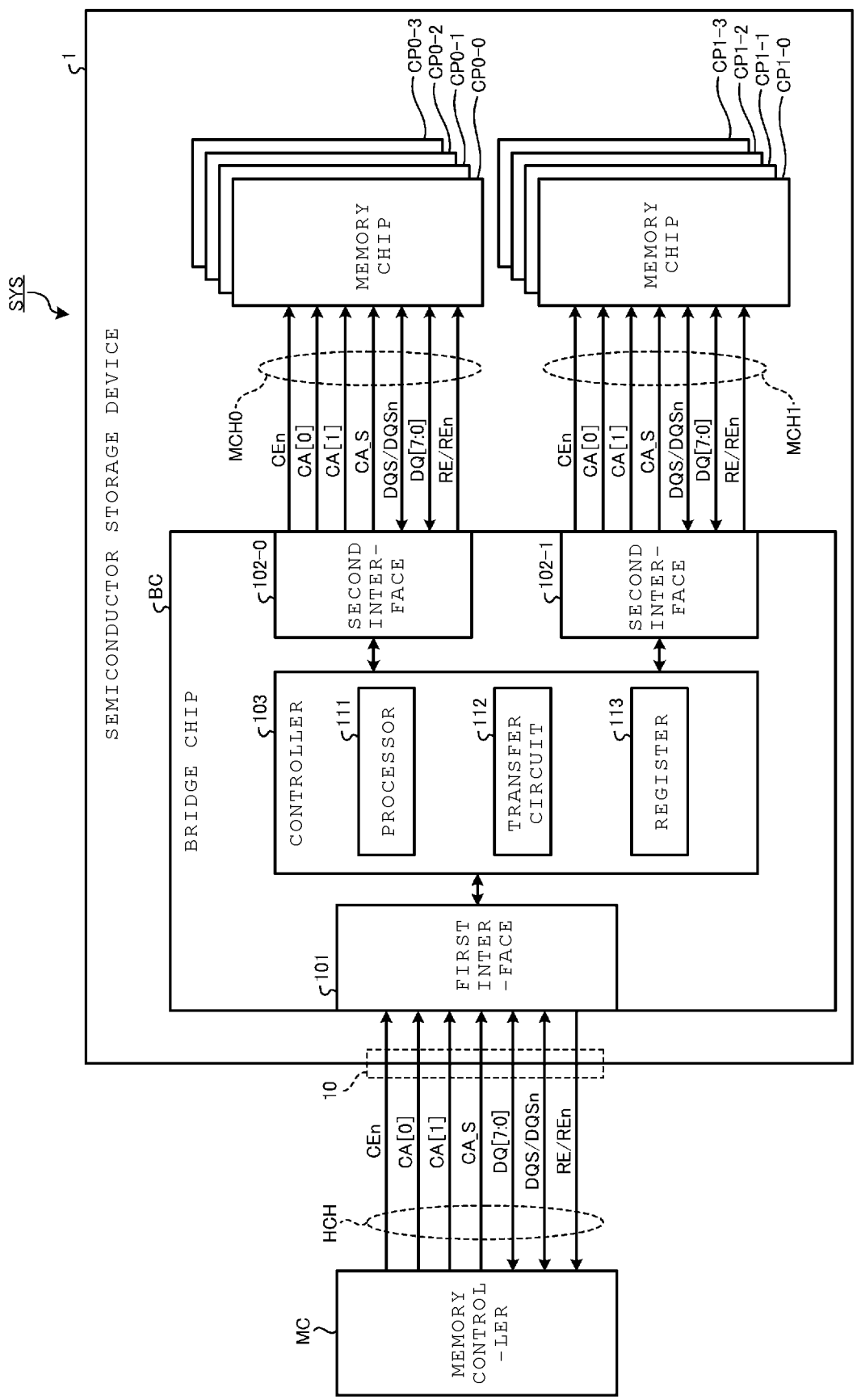
FIG. 1 is a schematic diagram illustrating an example of a configuration of a memory system according to a first embodiment.

FIG. 1 is a schematic diagram illustrating an example of a configuration of a memory system SYS according to a first embodiment.

The memory system SYS includes a memory controller MC and a semiconductor storage device 1. The semiconductor storage device 1 includes an external terminal group 10, a bridge chip BC, and a plurality of memory chips CP0-0 to CP0-3 and CP1-0 to CP1-3. The bridge chip BC is an example of the semiconductor device.

The semiconductor storage device 1 can be mounted as a multi-chip package (MCP) in which the memory chips CP0-0 to CP0-3 and the memory chips CP1-0 to CP1-3 are stacked. When the semiconductor storage device 1 is mounted as the MCP, in the semiconductor storage device 1, the bridge chip BC and the plurality of memory chips CP0-0 to CP0-3 and CP1-0 to CP1-3 may be sealed with a mold resin.

In FIG. 1, a configuration is illustrated in which the four memory chips CP0-0 to CP0-3 are connected to the bridge chip BC via a memory channel MCH0, and the four memory chips CP1-0 to CP1-3 are connected to the bridge chip BC via a memory channel MCH1. That is, the semiconductor storage device 1 can be configured as a multi-memory chip module including the plurality of (herein, eight) memory chips CP0-0 to CP0-3 and CP1-0 to CP1-3.

Each of the memory chips CP0-0 to CP0-3 and CP1-0 to CP1-3 is, for example, a memory chip of a nonvolatile memory such as a NAND flash memory. It is noted that the number of memory chips CP included in the semiconductor storage device 1 is not limited to eight. Further, the number of memory channels MCH connecting the bridge chip BC and the plurality of memory chips CP is not limited to two.

The semiconductor storage device 1 is connectable to the memory controller MC via the wired communication path. This wired communication path is denoted as a host channel HCH. The host channel HCH is configured in accordance with a predetermined standard. When each of memory chips CP0-0 to CP0-3 and CP1-0 to CP1-3 is the NAND flash memory, the predetermined standard is, for example, an SCA standard.

There bridge chip BC is electrically connected to the plurality of (herein, two) memory channels MCH. The plurality of memory chips CP0-0 to CP0-3 and CP1-0 to CP1-3 are connected to the bridge chip BC via the memory channels MCH0 and MCH1, respectively. The memory chips CP0-0 to CP0-3 are connected to the memory channel MCH0 configured in accordance with the predetermined standard. The memory chips CP1-0 to CP1-3 are connected to the memory channel MCH1 configured in accordance with the predetermined standard. When each memory chip CP is a NAND flash memory, the predetermined standard is, for example, an SCA standard. Hereinafter, it is assumed that each memory chip CP is a NAND type flash memory, and the predetermined standard is an SCA standard.

The host channel HCH includes a signal line transferring a chip enable signal CEn, a signal line transferring a command/address signal CA[0], a signal line transferring a command/address signal CA[1], a signal line transferring a command/address strobe signal CA_S, a signal line transferring a data strobe signal DQS/DQSn, a signal line transferring a data signal DQ[7:0] having a predetermined bit width (herein, as an example, a width of 8 bits), and a signal lines transferring a read enable signal RE/REn. It is noted that "n" written at the end of the symbol representing the signal indicates that the signal is operated with negative logic. Whether each signal is operated with negative logic or operated with positive logic can be freely designed.

The chip enable signal CEn is a signal for enabling the memory chip CP to be accessed. The data strobe signal DQS/DQSn is a signal that instructs a counter party device to take in the data transmitted by the data signal DQ[7:0]. The data strobe signal DQS/DQSn is a differential signal configured with a data strobe signal DQS and a data strobe signal DQSn. The read enable signal RE/REn is a signal that instructs the counter party device to output the data signal DQ[7:0]. The read enable signal RE/REn is a differential signal configured with a read enable signal RE and a read enable signal REn.

The command/address signal CA[0] and the command/address signal CA[1] are command signals or address signals. Each of the command/address signal CA[0] and the command/address signal CA[1] is a 1-bit width signal, and by the command/address signal CA[0] and the command/address signal CA[1], the command signal and the address signal can be transferred as a 2-bit width signal. The command/address strobe signal CA_S is a strobe signal for transferring the command/address signal CA[0] and the command/address signal CA[1]. Hereinafter, the command/address signal CA[0] and the command/address signal CA[1] will be collectively denoted as signal CA.

According to the SCA standard, the signal CA is transferred by using a signal line group different from the data signal DQ[7:0]. Therefore, the signal CA on the host channel HCH can be transferred while transferring the data signal DQ[7:0] on the host channel HCH.

Each of the memory channels MCH0 and MCH1 can transmit and receive the signal group of the same type as the signal group of the host channel HCH. That is, each of the memory channels MCH0 and MCH1 includes the signal line transferring the chip enable signal CEn, the signal line transferring the command/address signal CA[0], the signal line transferring the command/address signal CA[1], the signal line transferring the command/address strobe signal CA_S, the signal line transferring the data strobe signal DQS/DQSn, the signal line transferring the data signal DQ[7:0] having a predetermined bit width (herein, as an example, a width of 8 bits), and the signal line transferring the read enable signal RE/REn.

It is noted that the host channel HCH is an example of the first channel. The memory channels MCH0 and MCH1 are examples of second and third channels.

The bridge chip BC includes a first interface 101, two second interfaces 102, and a controller 103.

The first interface 101 is a PHY circuit that transmits and receives electrical signals to and from the memory controller MC via the host channel HCH.

The second interface 102-0 of the two second interfaces 102 is a PHY circuit that transmits and receives electrical signals to and from the four memory chips CP0-0 to CP0-3 via the memory channel MCH0. The second interface 102-1 of the two second interfaces 102 is a PHY circuit that transmits and receives electrical signals to and from the four memory chips CP1-0 to CP1-3 via the memory channel MCH1.

The controller 103 is disposed between the first interface 101 and the two second interfaces 102. The controller 103 controls the exchange of information between the first interface 101 and the two second interfaces 102.

The controller 103 includes a processor 111, a transfer circuit 112, and a register 113.

The processor 111 analyzes commands received from the memory controller MC via the host channel HCH. The processor 111 can issue the command to the memory chip CP according to the analysis result.

The register 113 is a memory that stores setting information for controlling the operations of the bridge chip BC. The setting information is not limited to specific information. The setting information may be, for example, information designating the size of data to be read. The setting information is transmitted from the memory controller MC and stored in the bridge chip BC. The controller 103 executes operations according to the setting information.

The transfer circuit 112 transfers signals between the first interface 101 and the two second interfaces 102. When transferring signals between the first interface 101 and the two second interfaces 102, the transfer circuit 112 can change the transfer rate (may be referred to as data transfer rate) according to the number of memory channels MCH used in parallel.

Each memory chip CP includes a memory cell array and can store data in the memory cell array in a non-volatile manner. The memory cell array includes a plurality of blocks, and each of the plurality of blocks includes a plurality of pages. The block is a unit area in which data stored therein is erased collectively. The page is a unit area on which writing or reading is executed collectively.

A logical unit number (LUN), which is a unique identification number within the semiconductor storage device 1, is assigned to each memory chip CP.

Figure 2:
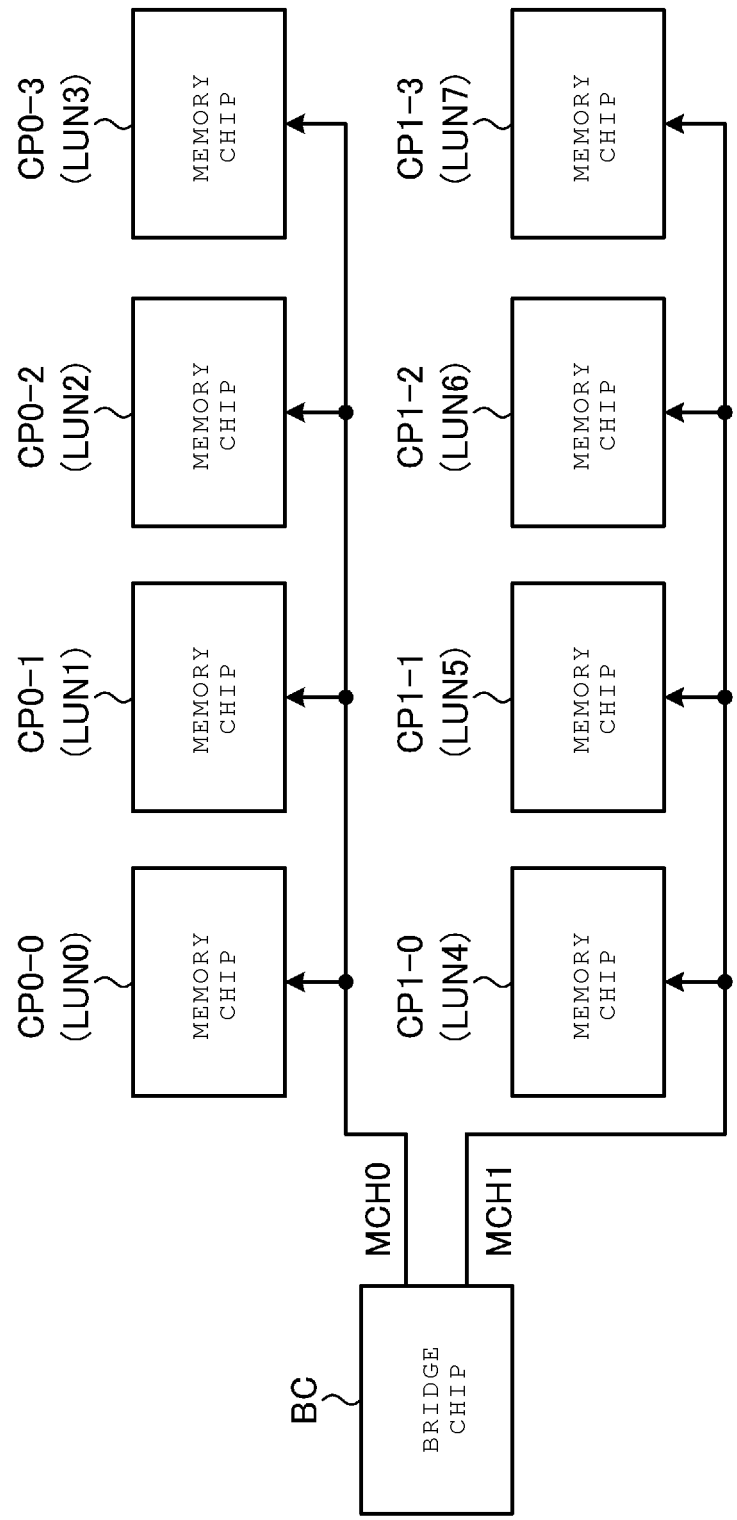
FIG. 2 is a schematic diagram illustrating LUNs assigned to respective memory chips in the first embodiment.

FIG. 2 is a schematic diagram illustrating LUNs assigned to each memory chip CP in the first embodiment.

In the example illustrated in FIG. 2, LUN0 is assigned to the memory chips CP0-0, LUN1 is assigned to the memory chips CP0-1, LUN2 is assigned to the memory chips CP0-2, LUN3 is assigned to the memory chips CP0-3, LUN4 is assigned to the memory chips CP1-0, LUN5 is assigned to the memory chip CP1-1, LUN6 is assigned to the memory chip CP1-2, and LUN7 is assigned to the memory chip CP1-3.

In the write operation or the read operation, the memory chip CP that is a target of the write operation or the read operation is designated by the LUN or an address including the LUN.

Figure 3:
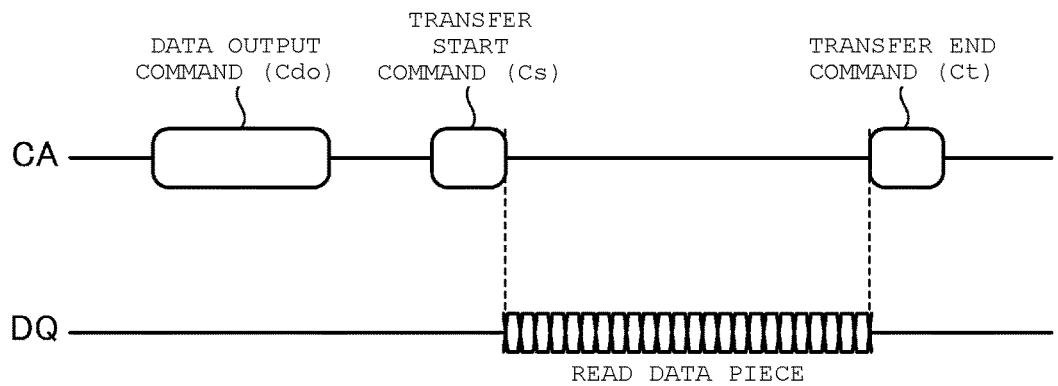
FIG. 3 is a schematic diagram illustrating an example of a command sequence used in a read operation of the first embodiment.

FIG. 3 is a schematic diagram illustrating an example of a command sequence used in the read operation of the first embodiment. FIG. 3 illustrates schematic waveforms of a CA signal and a DQ signal.

The command sequence used for the read operation includes a data output command Cdo, a transfer start command Cs, and a transfer end command Ct.

A device (hereinafter denoted as a transmitting device) on the transmitting side of the command sequence first transmits the data output command Cdo. The data output command Cdo includes a command identifier of the data output command Cdo and an address indicating the read position. It is noted that this address includes the LUN.

When the memory chip CP designated by the LUN included in the data output command Cdo receives the data output command Cdo, the data requested to be read (denoted as read data pieces) is read from a corresponding region of memory cells and prepared in a buffer (not illustrated) within the memory chip CP according to the data output command Cdo.

The transmitting device transmits the transfer start command Cs after a predetermined period of time or more has elapsed since transmission of the data output command Cdo. The transfer start command Cs is a command that instructs to start outputting the read data pieces. The transfer start command Cs includes at least an LUN in addition to the command identifier of the transfer start command Cs. In other words, the transmitting device can specify the memory chip CP of an output source of the read data pieces.

Outputting of the read data pieces to the transmitting device is started according to the transfer start command Cs. When the reception of the output read data pieces is completed, the transmitting device transmits the transfer end command Ct.

It is noted that, according to the SCA standard, during the period in which the pair of the transfer start command Cs and the transfer end command Ct is transmitted, neither a portion nor all of another pair of the transfer start command Cs and the transfer end command Ct is prohibited from being transmitted. After the completion of transmitting the pair of the transfer start command Cs and the transfer end command Ct, the transmitting device can transmit another pair of the transfer start command Cs and the transfer end command Ct. That is, after the completion of the reception operation of the read data pieces, the transmitting device can start the operation of receiving the next read data pieces.

It is noted that the reception operation of the read data pieces includes transmitting the transfer start command Cs, receiving the read data pieces output according to the transfer start command Cs, and transmitting the transfer end command Ct.

Figure 4:
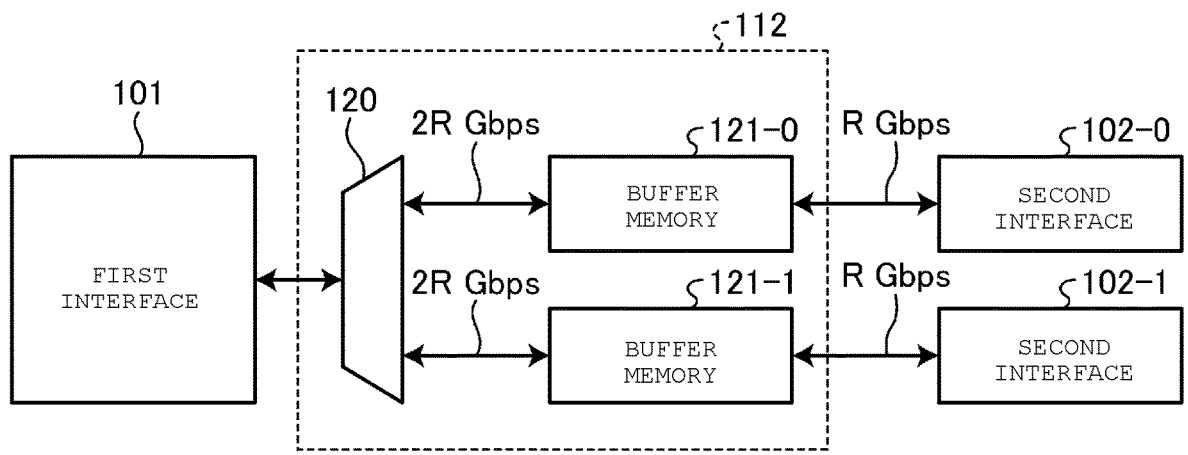
FIG. 4 is a schematic diagram illustrating an example of a configuration of a transfer circuit according to the first embodiment.

FIG. 4 is a schematic diagram illustrating an example of a configuration of the transfer circuit 112 according to the first embodiment.

The transfer circuit 112 includes a selector 120 and two buffer memories 121-0 and 121-1.

Each of the two buffer memories 121-0 and 121-1 has a capacity of at least one page size. Each of the two buffer memories 121-0 and 121-1 is configured, for example, with a static random access memory (SRAM). It is noted that the types of the memories constituting each of the two buffer memories 121-0 and 121-1 are not limited to these.

The buffer memory 121-0 is connected to the second interface 102-0. The buffer memory 121-0 is used for the data transfer to the memory chips CP0-0 to CP0-3 via the second interface 102-1 and the memory channel MCH0.

The buffer memory 121-1 is connected to the second interface 102-1. The buffer memory 121-1 is used for the data transfer to the memory chips CP1-0 to CP1-3 via the second interface 102-1 and the memory channel MCH1.

Further, the buffer memory 121-0 and the buffer memory 121-1 are connected to the selector 120. The selector 120 is connected to the first interface 101.

The processor 111 controls the selector 120 when performing the data transfer to the memory controller MC via the host channel HCH and the first interface 101. Accordingly, the processor 111 selects the buffer memory 121 to be used for the data transfer from among the buffer memories 121-0 and 121-1.

For example, when the processor 111 selects the buffer memory 121-0, data output from the memory chips CP0-0 to CP0-3 and received by the buffer memory 121-0 can be transferred to the memory controller MC. Furthermore, when the processor 111 selects the buffer memory 121-0, the buffer memory 121-0 can receive the data transferred from the memory controller MC and using the memory chips CP0-0 to CP0-3 as destinations.

Further, for example, when the processor 111 selects the buffer memory 121-1, data output from the memory chips CP1-0 to CP1-3 and received by the buffer memory 121-1 can be transferred to the memory controller MC. Further, when the processor 111 selects the buffer memory 121-1, the buffer memory 121-1 can receive the data transferred from the memory controller MC and using the memory chips CP1-0 to CP1-3 as destinations.

When a plurality of the memory channels MCH0 and MCH1 are used in parallel, the data transfer rate in the host channel HCH is multiple times the data transfer rate in each of the plurality of memory channels MCH0 and MCH1. When the data transfer rate in each of the memory channels MCH0 and MCH1 is expressed as R [Gbps], as an example herein, the data transfer rate in the host channel HCH is 2R [Gbps].

In the transfer circuit 112, data input/output via the second interfaces 102-0 and 102-1 to the buffer memories 121-0 and 121-1, respectively, is performed at the transfer rate of R [Gbps]. The data input/output via the first interface 101 and the selector 120 to each of the buffer memories 121-0 and 121-1 is performed at the transfer rate of 2R [Gbps].

Since the transfer rate in the host channel HCH is faster than the transfer rate in the memory channel MCH, in the read operation, after inputting the read data pieces from the memory chip CP to the buffer memory 121 is started, there is a period during which output of the read data pieces from the buffer memory 121 to the memory controller MC cannot be started.

Figure 5:
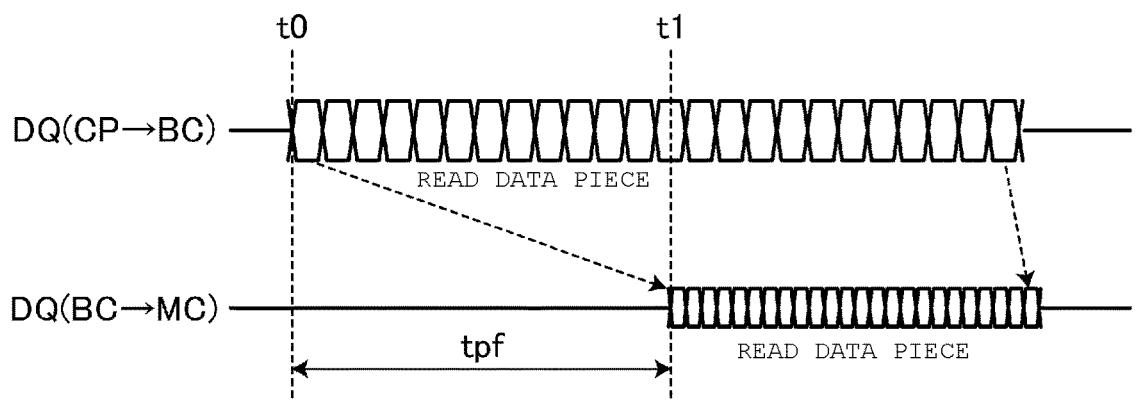
FIG. 5 is a schematic diagram illustrating an example of transfer of read data pieces according to the first embodiment.

FIG. 5 is a schematic diagram illustrating an example of transfer of the read data pieces according to the first embodiment.

In the example illustrated in FIG. 5, at timing t0, transfer of the read data pieces at the transfer rate of R [Gbps] from a certain memory chip CP to the bridge chip BC is started. The bridge chip BC receives the read data pieces in the buffer memory 121 corresponding to the memory chip CP.

In order to output the read data pieces that are input to the buffer memory 121 at R [Gbps] to the memory controller MC at the transfer rate of 2R [Gbps], at least a half of the amount of the read data pieces needs to be stored in the buffer memory 121 at the beginning of the output of the read data pieces. Therefore, at timing t1 when the half of the read data pieces has been stored in the buffer memory 121, transfer of the read data pieces from the bridge chip BC to the memory controller MC is started.

Such an operation of buffering a portion of the read data pieces in the buffer memory 121, which is executed in order to transfer the read data pieces to the memory controller MC without delay, is denoted as a prefetch operation. A waiting time caused by the prefetch operation is denoted as a prefetch time tpf.

Herein, a technique compared with the embodiment will be described. The technique compared with the embodiment will be denoted as a comparative example.

According to the comparative example, after the completion of transmitting the pair of the transfer start command Cs and the transfer end command Ct to the bridge chip, the memory controller transmits another pair of the transfer start command Cs and the transfer end command Ct. The bridge chip transfers each pair of the transfer start command Cs and the transfer end command Ct received from the memory controller to the respective destination memory chips as they are. In other words, after the bridge chip completes transferring the pair of the transfer start command Cs and the transfer end command Ct, the bridge chip transfers another pair of the transfer start command Cs and the transfer end command Ct.

That is, the bridge chip receives the plurality of read data pieces from the group of the memory chips serially in terms of time. Therefore, when focusing on data transfer between the memory controller and the bridge chip, the prefetch time tpf is needed every time the read data pieces are transferred, which results in poor data transfer efficiency.

In the first embodiment, when the bridge chip BC receives the data output command Cdo for the plurality of memory chips CP connected to different memory channels MCH from the memory controller MC, the bridge chip BC is configured to be able to autonomously generate and transmit a transfer start command Cs to each destination memory chip CP without waiting for the reception of the corresponding transfer start command Cs from the memory controller MC. Accordingly, since the bridge chip BC can transfer another read data pieces to the memory controller MC during the prefetch time tpf required for the certain read data pieces, the data transfer efficiency is improved.

Figure 6:
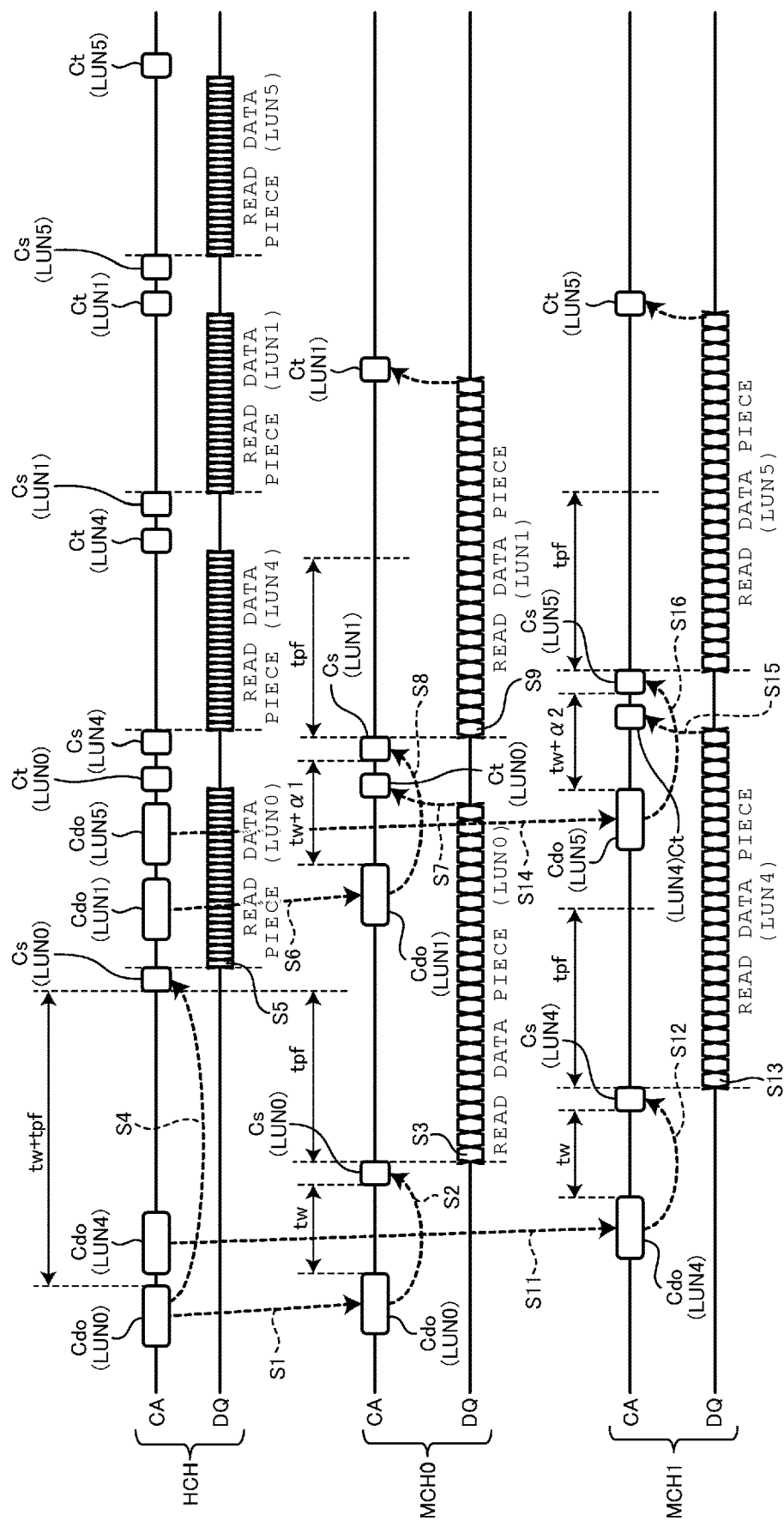
FIG. 6 is a timing chart illustrating an example of transfer of a plurality of command sequences related to a read operation in a memory system according to the first embodiment.

FIG. 6 is a timing chart illustrating an example of transfer of the plurality of command sequences related to the read operation in the memory system SYS according to the first embodiment.

From FIG. 6 and followings, each transfer end command Ct includes the LUN so that it can be understood which transfer start command Cs each transfer end command Ct corresponds to.

In the host channel HCH, the memory controller MC transmits the data output command Cdo targeting LUN0, the data output command Cdo targeting LUN4, the transfer start command Cs targeting LUN0, the data output command Cdo targeting LUN1, the data output command Cdo targeting LUN5, the transfer end command Ct corresponding to the transfer start command Cs targeting LUN0, the transfer start command Cs targeting LUN4, the transfer end command Ct corresponding to the transfer start command Cs targeting LUN4, the transfer start command Cs targeting LUN1, the transfer end command Ct corresponding to the transfer start command Cs targeting LUN1, the transfer start command Cs targeting LUN5, and the transfer end command Ct corresponding to the transfer start command Cs targeting LUN5 in this order to the bridge chip BC.

When focusing only on the pairs of the transfer start command Cs and the transfer end command Ct, the pair targeting LUN0, the pair targeting LUN4, the pair targeting LUN1, and the pair targeting LUN5 are transferred in this order serially from the memory controller MC to the bridge chip BC.

When the bridge chip BC receives the data output command Cdo targeting LUN0 from the memory controller MC, the controller 103 of the bridge chip BC transmits the data output commands Cdo targeting LUN0 to the memory chips CP0-0 of LUN0 via the memory channel MCH0 (S1).

When a preparation time tw has elapsed since transmission of the data output command Cdo targeting LUN0 to the memory chip CP0-0, the controller 103 autonomously generates and transmits the transfer start command Cs targeting LUN0 to the memory chip CP0-0 of LUN0 via the memory channel MCH0 (S2). At this time, the controller 103 has not received the corresponding transfer start command Cs targeting LUN0 from the memory controller MC.

The memory chip CP0-0, that is, the memory chip CP of LUN0, starts outputting the read data according to the transfer start command Cs (S3), and the controller 103 starts inputting the read data to the buffer memory 121 (more precisely, the buffer memory 121-0) is started.

After the preparation time tw and prefetch time tpf have elapsed since the transmission of the data output command Cdo targeting LUN0 to the bridge chip BC, the memory controller MC transmits the transfer start command Cs targeting LUN0 to the bridge chip BC (S4). At this time, in the bridge chip BC, the prefetch time tpf has elapsed since the transmission of the transfer start command Cs targeting LUN0 to the memory chips CP0-0 is completed. Therefore, a half of the read data pieces requested to be read from the memory chips CP0-0 are buffered in the buffer memory 121-0. Therefore, the bridge chip BC starts outputting the read data pieces from the buffer memory 121-0 (S5).

The bridge chip BC receives the data output command Cdo targeting LUN1, while receiving the read data pieces from the memory chips CP0-0, and transmits the data output command Cdo targeting LUN1 via the memory channel MCH0 to the memory chips CP0-1 of LUN1 (S6).

When the reception of the read data pieces from the memory chip CP0-0 is completed, the controller 103 autonomously generates and transmits the transfer start command Cs targeting LUN0 via the memory channel MCH0 to the memory chip CP0-0 of LUN0 (S7).

When the preparation time tw has elapsed since the transmission of the data output command Cdo targeting LUN 1 and when the transmission of the transfer end command Ct corresponding to the transfer start command Cs targeting LUN 0 is completed, the controller 103 autonomously generates and transmits the transfer start command Cs targeting LUN1 via the memory channel MCH0 to the memory chip CP0-1 of LUN1 (S8). At this time, the controller 103 has not received the corresponding transfer start command Cs targeting LUN1 from the memory controller MC.

It is noted that, in the example illustrated in FIG. 6, at the timing when a time (tw+α1) has elapsed since the transmission of the data output command Cdo targeting LUN1, the transmission of the transfer end command Ct corresponding to the transfer start command Cs targeting LUN0 is completed. Accordingly, the transfer start command Cs targeting LUN1 is transmitted to the memory chips CP0-1.

The memory chip CP0-1, that is, the memory chip CP of LUN1, starts outputting the read data according to the transfer start command Cs (S9), and the controller 103 starts inputting the read data to the buffer memory 121 (more precisely, the buffer memory 121-0).

Furthermore, when the bridge chip BC receives the data output command Cdo targeting LUN4 from the memory controller MC, the controller 103 transmits the data output command Cdo targeting LUN4 via the memory channel MCH1 to the memory chip CP1-0 of LUN4 (S11).

When the preparation time tw has elapsed since the transmission of the data output command Cdo targeting LUN4 to the memory chip CP1-0, the controller 103 autonomously generates and transmits the transfer start command Cs targeting LUN4 via the memory channel MCH1 to the memory chip CP1-0 of LUN4 (S12). At this time, the controller 103 has not received the corresponding transfer start command Cs targeting LUN4 from the memory controller MC.

The memory chip CP1-0, that is, the memory chip CP of LUN4, starts outputting the read data according to the transfer start command Cs (S13), and the controller 103 starts inputting the read data to the buffer memory 121 (more precisely, the buffer memory 121-1).

The controller 103 receives the data output command Cdo targeting LUN5, while receiving the read data pieces from the memory chips CP1-0, and transmits the data output command Cdo targeting LUN5 via the memory channel MCH1 to the memory chip CP1-1 of LUN5 (S14).

When the reception of the read data pieces from the memory chip CP1-0 is completed, the controller 103 autonomously generates and transmits the transfer end command Ct corresponding to the transfer start command Cs targeting LUN4 via the memory channel MCH1 to the memory chip CP1-0 of LUN4 (S15).

When the preparation time tw has elapsed since the transmission of the data output command Cdo targeting LUN 5 and when the transmission of the transfer end command Ct corresponding to the transfer start command Cs targeting LUN 4 is completed, the controller 103 autonomously generates and transmits the transfer start command Cs targeting LUN5 via the memory channel MCH1 to the memory chip CP1-1 of LUN5 (S16). At this time, the controller 103 has not received the corresponding transfer start command Cs targeting LUN5 from the memory controller MC.

In the example illustrated in FIG. 6, at the timing when a time (tw+α2) has elapsed since the transmission of the data output command Cdo targeting LUN 5, the transmission of the transfer end command Ct corresponding to the transfer start command Cs targeting LUN 4 is completed. Accordingly, the transfer start command Cs targeting LUN5 is transmitted to the memory chip CP1-1.

The memory controller MC transmits the data output command Cdo designating each of LUN0, LUN4, LUN1, and LUN5 in this order to the bridge chip BC. Based on these received data output commands Cdo, the controller 103 of the bridge chip BC autonomously generate and transmits the transfer start command Cs, receives the read data pieces, and transmits the transfer end command Ct for LUN0 and LUN1 in this order via the memory channel MCH0 and for LUN4 and LUN5 in this order via the memory channel MCH1. The memory controller MC transmits the transfer start command Cs, receives the read data pieces, and transmits the transfer end command Ct to the bridge chip BC in the order of LUN0, LUN4, LUN1, and LUN5. The controller 103 of the bridge chip BC outputs the read data pieces input in advance to the buffer memory 121 from the memory chip CP designated by each received transfer start command Cs from the buffer memory 121 to the memory controller MC according to each transfer start command Cs.

In this manner, the controller 103 promptly transfers each data output command Cdo received from the memory controller MC via the memory channel MCH corresponding to the destination memory chip CP of each data output command Cdo to the destination memory chip CP. When receiving the data output command Cdo, the controller 103 autonomously generates and transmits the transfer start command Cs of the pair of the transfer start command Cs and the transfer end command Ct corresponding to the data output command Cdo to the memory chip CP without waiting for the reception of the transfer start command Cs from the memory controller MC (even without the reception). As a result, the controller 103 can receive the plurality of read data pieces from the group of the memory chips CP in parallel. In other words, during a period overlapping a portion or all of the period during which the read data pieces output from the first memory chip CP are input to the buffer memory 121, the controller 103 can input the read data pieces output from another memory chip CP via another memory channel MCH to another buffer memory 121. Accordingly, since the bridge chip BC can output the first read data pieces to the memory controller MC before the prefetch time tpf required for receiving another read data pieces has elapsed, the data transfer efficiency is improved compared to the comparative example.

Figure 7:
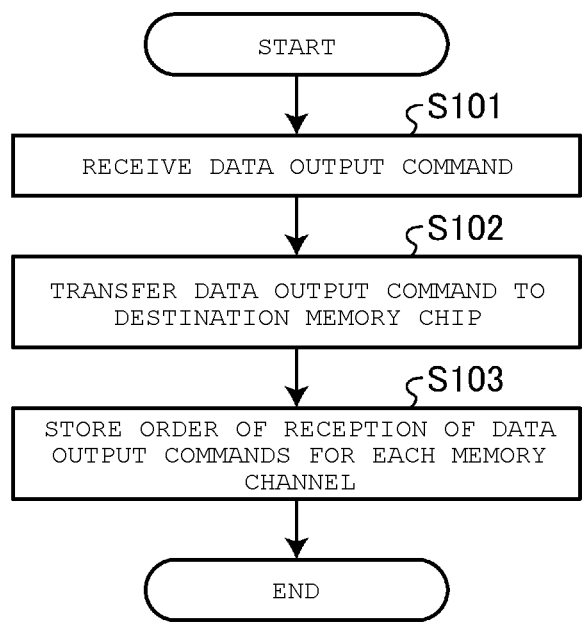
FIG. 7 is a flowchart illustrating an example of an operation of transferring a data output command by a bridge chip of the first embodiment.

Subsequently, details of the control of the bridge chip BC of the first embodiment for implementing the operation illustrated in FIG. 6 will be described. FIG. 7 is a flowchart illustrating an example of the operation of transferring the data output command Cdo by the bridge chip BC of the first embodiment.

When the bridge chip BC receives the data output command Cdo (S101), the controller 103 transfers the data output command Cdo to the destination memory chip CP (S102). Then, the controller 103 stores the order of reception of the data output commands Cdo for each memory channel MCH (S103). Then, the operation of transferring the data output command Cdo ends. It is noted that the order of S102 and S103 may be reversed.

In the example illustrated in FIG. 6, the controller 103 transmits the data output command Cdo targeting LUN1 after transmitting the data output command Cdo targeting LUN0. In this case, the controller 103 stores the order of the data output commands Cdo targeting LUN0 and the data output commands Cdo targeting LUN1 as the order of reception of the data output commands Cdo related to the memory channel MCH0. Further, the controller 103 transmits the data output command Cdo targeting LUN5 after transmitting the data output command Cdo targeting LUN4. In this case, the controller 103 stores the order of the data output command Cdo targeting LUN4 and the data output command Cdo targeting LUN5 as the order of reception of the data output commands Cdo related to the memory channel MCH1.

Figure 8:
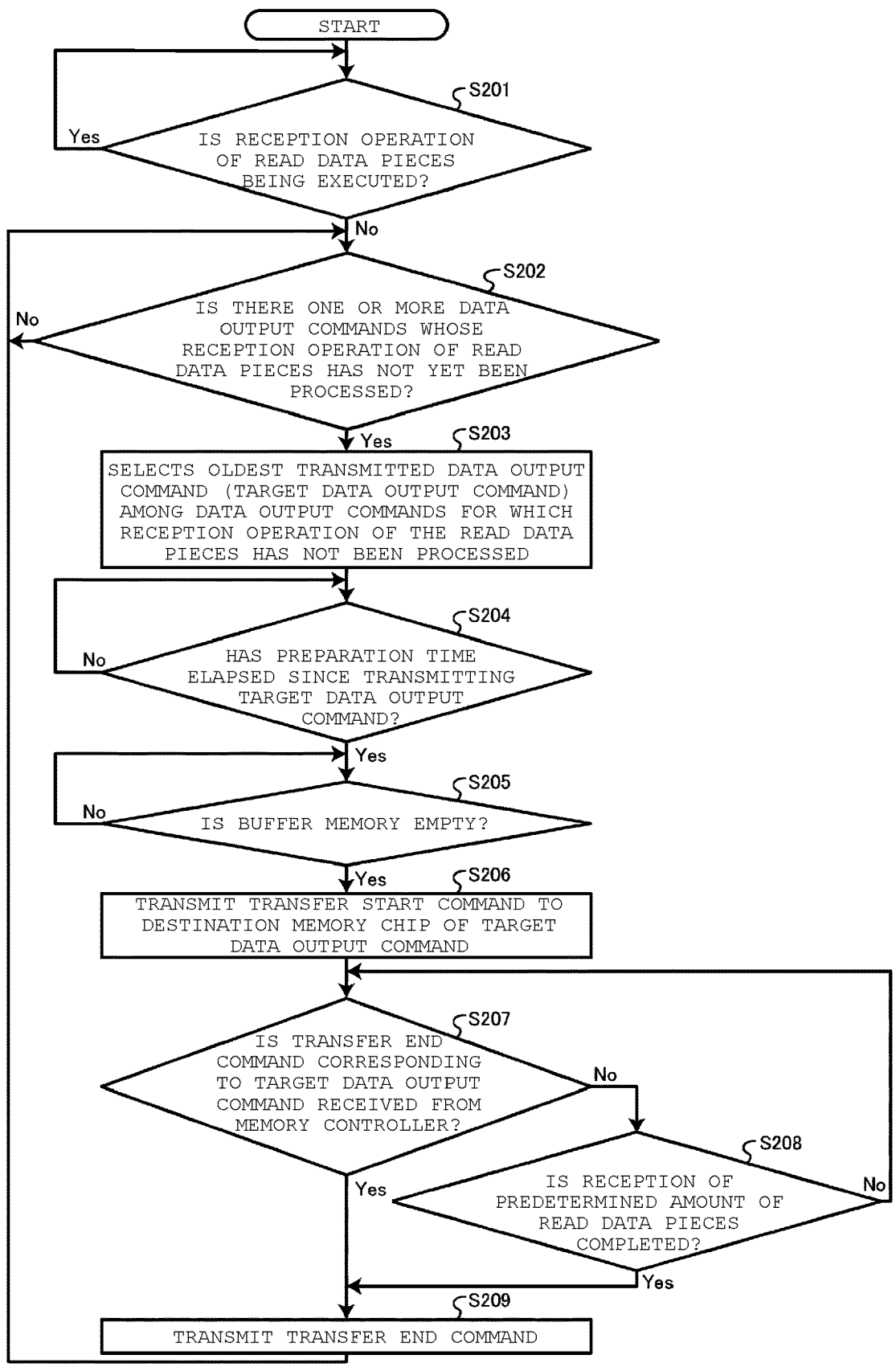
FIG. 8 is a flowchart illustrating an example of an operation of transmitting a transfer start command and a transfer end command by the bridge chip of the first embodiment.

FIG. 8 is a flowchart illustrating an example of the operation of transmitting the transfer start command Cs and the transfer end command Ct by the bridge chip BC of the first embodiment. It is noted that a series of operations illustrated in FIG. 8 is individually executed for each memory channel MCH. In FIG. 8, the operation related to a certain memory channel MCH (denoted as a target memory channel MCH) will be described.

The controller 103 determines whether the reception operation of the read data pieces is being executed in the target memory channel MCH (S201). The reception operation of the read data pieces includes transmitting the transfer start command Cs, receiving the read data pieces, and transmitting the transfer end command Ct. When the reception operation of the read data pieces is being executed in the target memory channel MCH (S201: Yes), the controller 103 executes the process of S201 again.

When the reception operation of the read data pieces is not being executed in the target memory channel MCH (S201: No), the controller 103 determines whether there is one or more data output commands Cdo of which reception operation of the read data pieces has not yet been processed among the transmitted data output commands Cdo related to the target memory channel MCH (S202).

The controller 103 stores the transmitted data output command Cdo related to the target memory channel MCH through the operation illustrated in FIG. 7. In the process of S202, the controller 103 determines whether there is one or more data output commands Cdo for which the reception operation of the read data pieces has not yet started, among the transmitted data output commands Cdo related to the stored target memory channel MCH.

When there is no one or more data output commands Cdo for which the reception operation of the read data pieces has not yet been processed (S202: No), the controller 103 executes the process of S202 again.

When there is one or more data output commands Cdo for which the reception operation of the read data pieces has not been processed (S202: Yes), the controller 103 selects the oldest transmitted data output command Cdo among one or more data output commands Cdo for which the reception operation of the read data pieces has not been processed (S203). It is noted that, in the description of FIG. 8, the data output command Cdo selected by the process of S203 will be denoted as the target data output command Cdo.

The controller 103 determines whether the preparation time tw has elapsed since transmission of the target data output command Cdo (S204). When the preparation time tw has not elapsed since transmission of the target data output command Cdo (S204: No), the controller 103 executes the process of S204 again.

When the preparation time tw has elapsed since transmission of the target data output command Cdo (S204: Yes), the controller 103 determines whether the buffer memory 121 corresponding to the target memory channel MCH is empty (S205). The fact that the buffer memory 121 is empty denotes that there is a space available for receiving the read data pieces.

When the buffer memory 121 corresponding to the target memory channel MCH is not empty (S205: No), the controller 103 executes the process of S205 again.

When the buffer memory 121 corresponding to the target memory channel MCH is empty (S205: Yes), the controller 103 transmits the transfer start command Cs to the destination memory chip CP of the target data output command Cdo (S206).

After the transmission of the transfer start command Cs, the controller 103 determines whether the transfer end command Ct corresponding to the target data output command Cdo has been received from the memory controller MC (S207).

When the transfer end command Ct corresponding to the target data output command Cdo has not been received from the memory controller MC (S207: No), the controller 103 determines whether the reception of a predetermined amount of the read data pieces has been completed (S208). When the reception of the predetermined amount of read data pieces has not been completed (S208: No), the controller 103 executes the process of S207 again.

It is noted that, in the process of S208, the predetermined amount is, for example, an amount of one page. It is noted that the predetermined amount is not limited to this example. For example, the controller 103 may be configured to receive the designation of the data amount along with the data output command Cdo or before the data output command Cdo. In such a case, a predetermined amount may be a designated data amount.

When the transfer end command Ct corresponding to the target data output command Cdo has been received from the memory controller MC (S207: Yes), or when the reception of the predetermined amount of read data pieces is completed (S208: Yes), the controller 103 transmits the transfer end command Ct via the target memory channel MCH (S209). Then, the controller 103 executes the process of S202 again.

Figure 9:
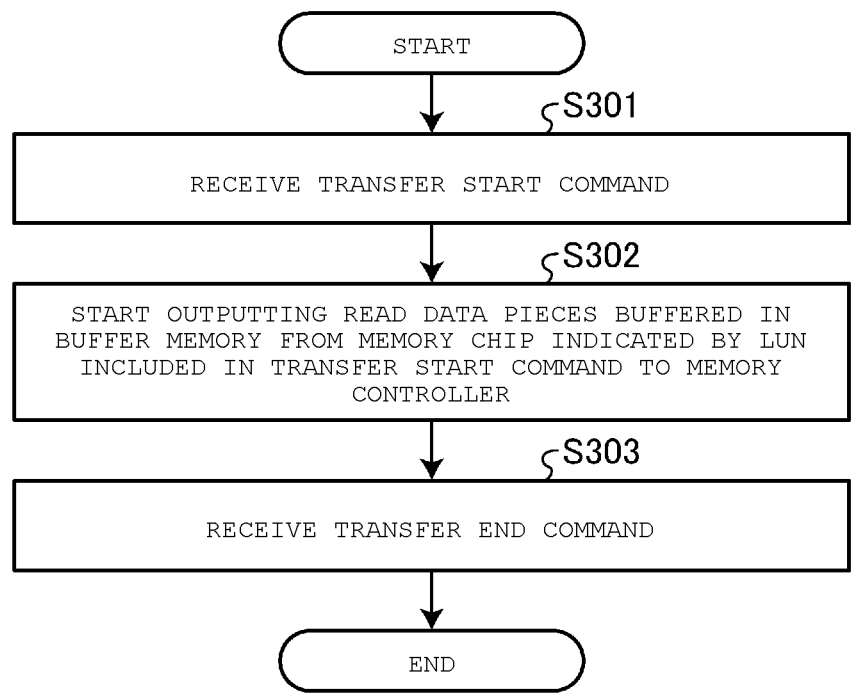
FIG. 9 is a flowchart illustrating an example of a series of operations of the bridge chip of the first embodiment related to output of the read data pieces to the memory controller.

FIG. 9 is a flowchart illustrating an example of a series of the operations of the bridge chip BC of the first embodiment related to output of the read data pieces to the memory controller MC.

The memory controller MC is configured so as to transmit the transfer start command Cs corresponding to the data output command Cdo after the elapsed time from the transmission of the certain data output command Cdo exceeds a sum of the preparation time tw and the prefetch time tpf. That is, the bridge chip BC receives the transfer start command Cs from the memory controller MC after the completion of the prefetch operation.

When the bridge chip BC receives the transfer start command Cs (S301), the controller 103 starts outputting of the read data pieces, buffered in the buffer memory 121, from the memory chip CP indicated by the LUN included in the transfer start command to the memory controller MC (S302).

When the reception of the desired amount of read data pieces is completed, the memory controller MC can transmit the transfer end command Ct. When receiving the transfer end command Ct (S303), the controller 103 completes the output of the read data pieces started in the process of S302, and thus a series of the operations related to outputting the read data pieces to the memory controller MC ends.

It is noted that, in the above-described example, it has been described that the two memory channels MCH are connected to the bridge chip BC. M (M is an integer of 3 or more) memory channels MCH may be connected to the bridge chip BC, and the transfer circuit 112 may include M buffer memories 121 corresponding to the M memory channels MCH. In such a case, the bridge chip BC can execute the reception operation of the read data string in parallel by N (N is an integer between 2 and M) memory channels MCH for the group of the memory chips CP by performing the operation illustrated in FIG. 7 and FIG. 8. Then, in the operation illustrated in FIG. 9, the bridge chip BC can output one or more read data pieces buffered in the buffer memory 121 to the memory controller MC at the transfer rate that is N times the transfer rate of the memory channel MCH.

Further, the M memory channels MCH may be connected to the bridge chip BC, and the transfer circuit 112 may include the L (L is an integer of 2 or more and M or less) buffer memories 121. In such a case, the bridge chip BC can perform the reception operation of the read data string in parallel for the group of the memory chips CP by using the P (P is an integer of 2 or more and L or less) memory channels MCH. Then, the bridge chip BC can output one or more read data pieces buffered in the buffer memory 121 to the memory controller MC at the transfer rate that is P times the transfer rate of the memory channel MCH.

As described above, according to the first embodiment, when receiving the data output command Cdo for each of the two memory chips CP (for example, denoted as the first memory chip CP and the second memory chip CP) connected to different memory channels MCH from the memory controller MC, the controller 103 perform the operation as follows. That is, the controller 103 transmits the first data output command Cdo to the first memory chip CP according to the reception of the output command Cdo (denoted as the first data output command Cdo) targeting the first memory chip CP and transmits the second data output command Cdo to the second memory chip CP according to the reception of the output command Cdo (denoted as the second data output command Cdo) targeting the second memory chip CP. Then, before the reception of the transfer start command Cs (denoted as the first transfer start command Cs) corresponding to the first data output command Cdo from the memory controller MC, the controller 103 autonomously generates and transmits the first transfer start command Cs to the first memory chip CP and starts inputting the read data pieces (denoted as the first read data pieces) output from the first memory chip CP to the buffer memory 121 according to the first transfer start command Cs. Before the reception of the transfer start command Cs (denoted as the second transfer start command Cs) corresponding to the second data output command Cdo from the memory controller MC, the controller 103 autonomously generates and transmits the second transfer start command Cs to the second memory chip CP and starts inputting the read data pieces (denoted as the second read data pieces) output from the second memory chip CP to the buffer memory 121 according to the second transfer start command Cs. When receiving the first transfer start command Cs from the memory controller MC, the controller 103 starts outputting the first read data pieces from the buffer memory 121 to the memory controller MC at the transfer rate faster than the memory channel MCH. When receiving the second transfer start command Cs from the memory controller MC, the controller 103 starts outputting the second read data pieces from the buffer memory 121 to the memory controller MC at the transfer rate faster than the memory channel MCH.

During a period overlapping a portion or all of the period during which the first read data pieces output from the first memory chip CP are input to the buffer memory 121, the controller 103 can input the second read data pieces output from the second memory chip CP to the buffer memory 121. Accordingly, since the controller 103 can output other read data pieces among the first read data pieces and the second read data pieces to the memory controller MC before the prefetch time tpf required for receiving one among the first read data pieces and the second read data pieces has elapsed, the data transfer efficiency is improved compared to the comparative example.

Further, according to the first embodiment, during a period overlapping a portion or all of the period during which the first read data pieces output from the first memory chip CP are input to the buffer memory 121, the controller 103 inputs the second read data pieces from the second memory chip CP to the buffer memory 121. Then, the controller 103 serially performs outputting the first read data pieces from the buffer memory 121 to the memory controller MC and outputting the second read data pieces from the buffer memory 121 to the memory controller MC. Accordingly, since the controller 103 can output other read data pieces among the first read data pieces and the second read data pieces to the memory controller MC before the prefetch time tpf required for receiving one among the first read data pieces and the second read data pieces has elapsed, the data transfer efficiency is improved compared to the comparative example.

According to the first embodiment, the read data pieces are received for each memory channel MCH in the reception order of the plurality of data output commands Cdo. That is, for example, when the bridge chip BC receives the data output command Cdo (denoted as a third data output command Cdo) for the memory chip CP (third memory chip CP) connected to the same memory channel MCH as the first memory chip CP after the reception of the first data output command Cdo, the controller 103 can autonomously generate and transmit the third transfer start command Cs to the third memory chip CP after inputting the first read data pieces to the buffer memory 121 is completed, before the reception of the transfer start command Cs (denoted as a third transfer start command Cs) corresponding to the third data output command Cdo from the memory controller MC. The controller 103 starts inputting the read data pieces (denoted as third read data pieces) output from the third memory chip CP to the buffer memory 121 according to the third transfer start command Cs.

Second Embodiment

According to the first embodiment, the bridge chip BC outputs the read data pieces in the reception order of the data output commands Cdo from the host channel HCH. In the second embodiment, the configuration of the bridge chip BC capable of outputting the read data pieces in the order different from the reception order of the data output commands Cdo from the host channel HCH will be described. Herein, the same items as in the first embodiment will be omitted in description or will be described briefly.

In the second embodiment, the bridge chip BC is configured to be able to receive the prefetch command Cpf. The prefetch command Cpf includes an LUN designation. When receiving the prefetch command Cpf, the bridge chip BC transmits the transfer start command Cs to the memory chip CP indicated by the LUN included in the prefetch command Cpf.

Figure 10:
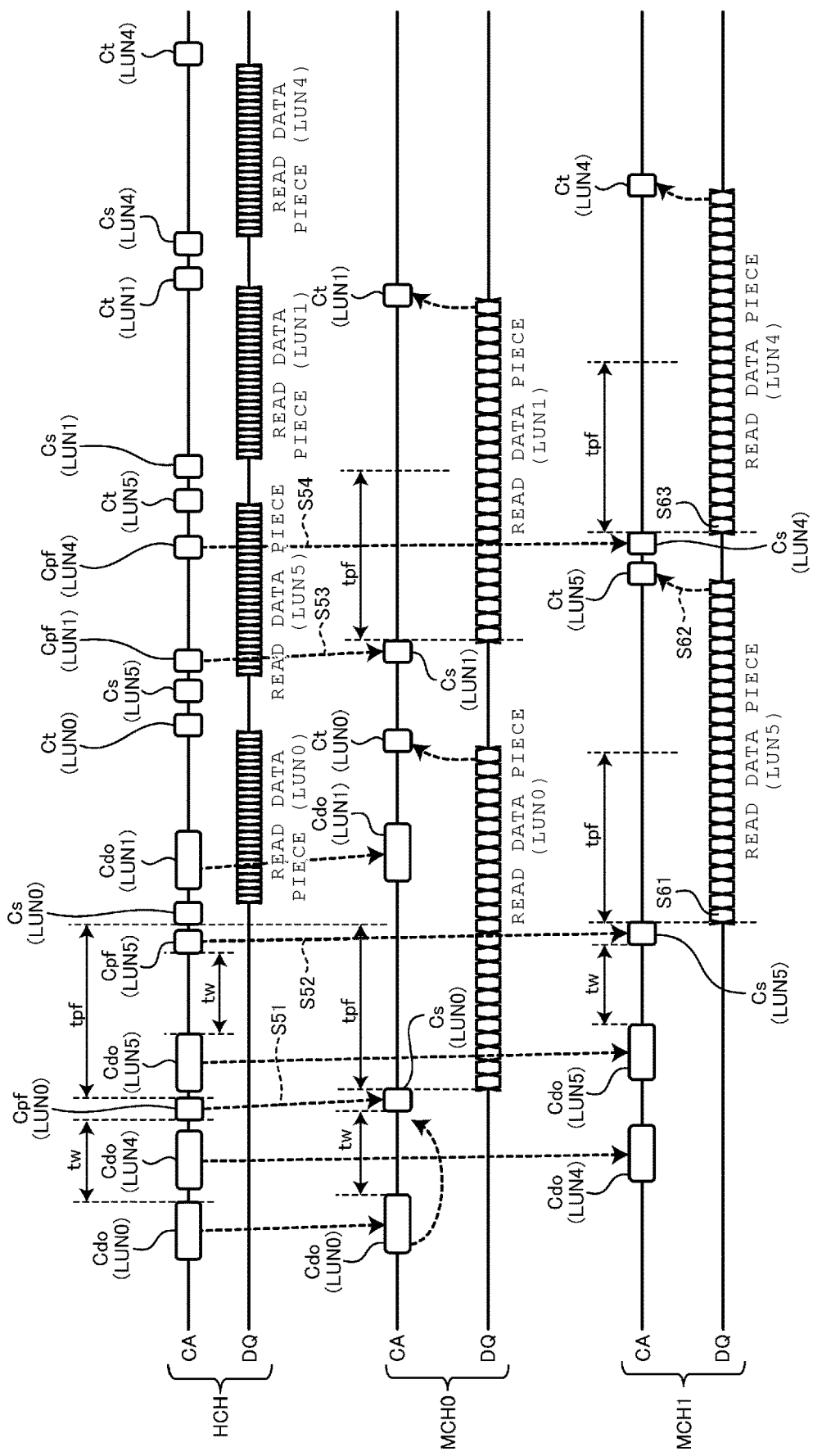
FIG. 10 is a timing chart illustrating an example of transfer of a plurality of command sequences related to a read operation in a memory system according to a second embodiment.

FIG. 10 is a timing chart illustrating an example of transfer of the plurality of command sequences related to the read operation in the memory system SYS according to the second embodiment.

When transmitting the data output command Cdo targeting the certain LUN, the memory controller MC can transmit the prefetch command Cpf designating that LUN after the preparation time tw has elapsed since the transmission of the data output command Cdo.

Further, when the prefetch time tpf has elapsed since the transmission of the prefetch command Cpf designating the certain LUN, the memory controller MC can transmit the transfer start command Cs targeting that LUN.

In the example illustrated in FIG. 10, the memory controller MC transmits the data output command Cdo targeting LUN0, the data output command Cdo targeting LUN4, the prefetch command Cpf designating LUN0, the data output command Cdo targeting LUN5, the prefetch command Cpf designating LUN5, the transfer start command Cs targeting LUN0, the data output command Cdo targeting LUN1, the transfer end command Ct corresponding to the transfer start command Cs targeting LUN0, the transfer start command Cs targeting LUN5, the prefetch command Cpf designating LUN1, the prefetch command Cpf designating LUN4, the transfer end command Ct corresponding to the transfer start command Cs targeting LUN5, the transfer start command Cs targeting LUN1, the transfer end command Ct corresponding to the transfer start command Cs targeting LUN1, the transfer start command Cs targeting LUN4, the transfer end command Ct corresponding to the transfer start command Cs targeting LUN4 in this order in accordance with the above-described rules.

The memory controller MC transmits the data output command Cdo to each of LUN0, LUN4, LUN5, and LUN1 in this order. Then, the memory controller MC transmits the prefetch command Cpf designating each of LUN0, LUN5, LUN1, and LUN4 in this order.

The controller 103 of the bridge chip BC promptly transfers each data output command Cdo received from the memory controller MC to the destination memory chip CP via the memory channel MCH corresponding to the destination memory chip CP of each data output command Cdo. Then, when receiving one prefetch command Cpf, the controller 103 transmits the transfer start command Cs to the memory chip CP indicated by the LUN included in the received prefetch command Cpf. The controller 103 starts inputting the read data pieces output according to the transfer start command Cs to the buffer memory 121.

Therefore, the controller 103 transmits four transfer start commands Cs in the order of LUN0, LUN5, LUN1, and LUN4, not in the reception order of the data output commands Cdo but in the reception order of the prefetch commands Cpf (S51, S52, S53, and S54).

By transmitting the transfer start command Cs to the bridge chip BC, the memory controller MC can cause the bridge chip BC to start outputting the read data string for which the prefetch operation has been completed.

In the example illustrated in FIG. 10, the memory controller MC transmits the prefetch command Cpf designating LUN0, LUN5, LUN1, and LUN4 to the bridge chip BC in the order of LUN0, LUN5, LUN1, and LUN4, the transfer start command Cs is transmitted to each of LUN0, LUN5, LUN1, and LUN4. The controller 103 of the bridge chip BC outputs the read data pieces, input in advance from the memory chip CP designated by each received transfer start command Cs to the buffer memory 121, from the buffer memory 121 to the memory controller MC according to each transfer start command Cs.

As described above, according to the second embodiment, the controller 103 of the bridge chip BC can perform the reception operation of the read data strings in the order different from the order of the destinations of the plurality of data output commands Cdo.

Herein, the example illustrated in FIG. 10 will be described, focusing on the transfer of the plurality of read data strings via the memory channel MCH1.

With respect to the memory chips CP1-0 to CP1-3 connected to the memory channel MCH1, the controller 103 of the bridge chip BC receives the data output command Cdo targeting LUN4 and the data output command Cdo targeting LUN5 in this order from the memory controller MC. Furthermore, before the reception of the transfer start command Cs corresponding to the data output command Cdo targeting LUN 5, and before the reception of the prefetch command Cpf corresponding to the data output command Cdo targeting LUN 4, the controller 103 receives the prefetch command Cpf corresponding to the data output command Cdo targeting LUN 5. The controller 103 transmits the transfer start command Cs corresponding to the data output command Cdo targeting LUN 5 to the memory chip CP1-1 according to the prefetch command Cpf corresponding to the data output command Cdo targeting LUN 5 (S52), and starts inputting the read data pieces output from the memory chip CP1-1 to the buffer memory 121 (more precisely, the buffer memory 121-1) according to this transfer start command Cs (S61). After the completion of inputting the read data pieces output from the memory chip CP1-1 to the buffer memory 121 (S62), more precisely, after transmitting the transfer end command Ct corresponding to the data output command Cdo targeting LUN5, when receiving the prefetch command Cpf corresponding to the data output command Cdo targeting LUN4 from the memory controller MC, the controller 103 transmits the transfer start command Cs corresponding to the data output command Cdo targeting LUN4 according to the prefetch command Cpf corresponding to the data output command Cdo targeting LUN4 (S54). Then, the controller 103 starts inputting the read data pieces output from the memory chip CP1-0 according to the transfer start command Cs corresponding to the data output command Cdo targeting LUN4 to the buffer memory 121 (more precisely, the buffer memory 121-1) (S63).

In this way, when receiving the plurality of prefetch commands Cpf in the order different from the order of the destinations of the plurality of data output commands Cdo, the controller 103 of the bridge chip BC executes the reception operation of the read data string according to the reception order of the plurality of prefetch commands Cpf.

Figure 11:
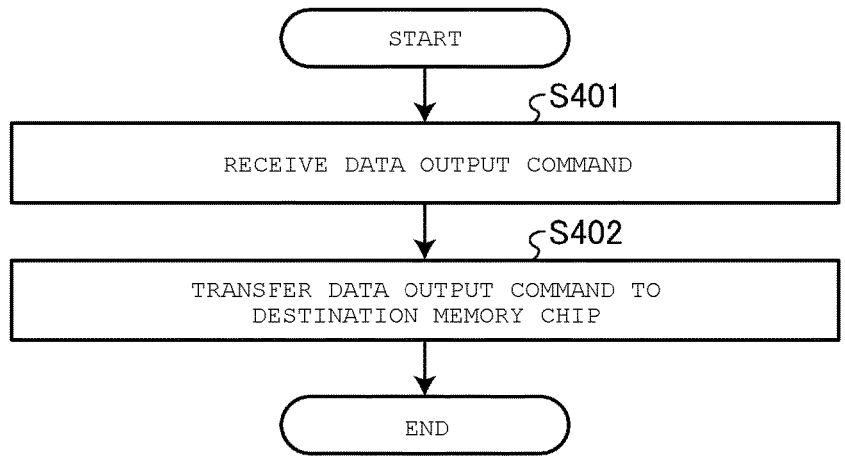
FIG. 11 is a flowchart illustrating an example of an operation of transferring a data output command by a bridge chip of the second embodiment.

FIG. 11 is a flowchart illustrating an example of the operation of transferring the data output command Cdo by the bridge chip BC of the second embodiment.

When the bridge chip BC receives the data output command Cdo (S401), the controller 103 transfers the data output command Cdo to the destination memory chip CP (S402). Then, the operation of transferring the data output command Cdo ends.

Figure 12:
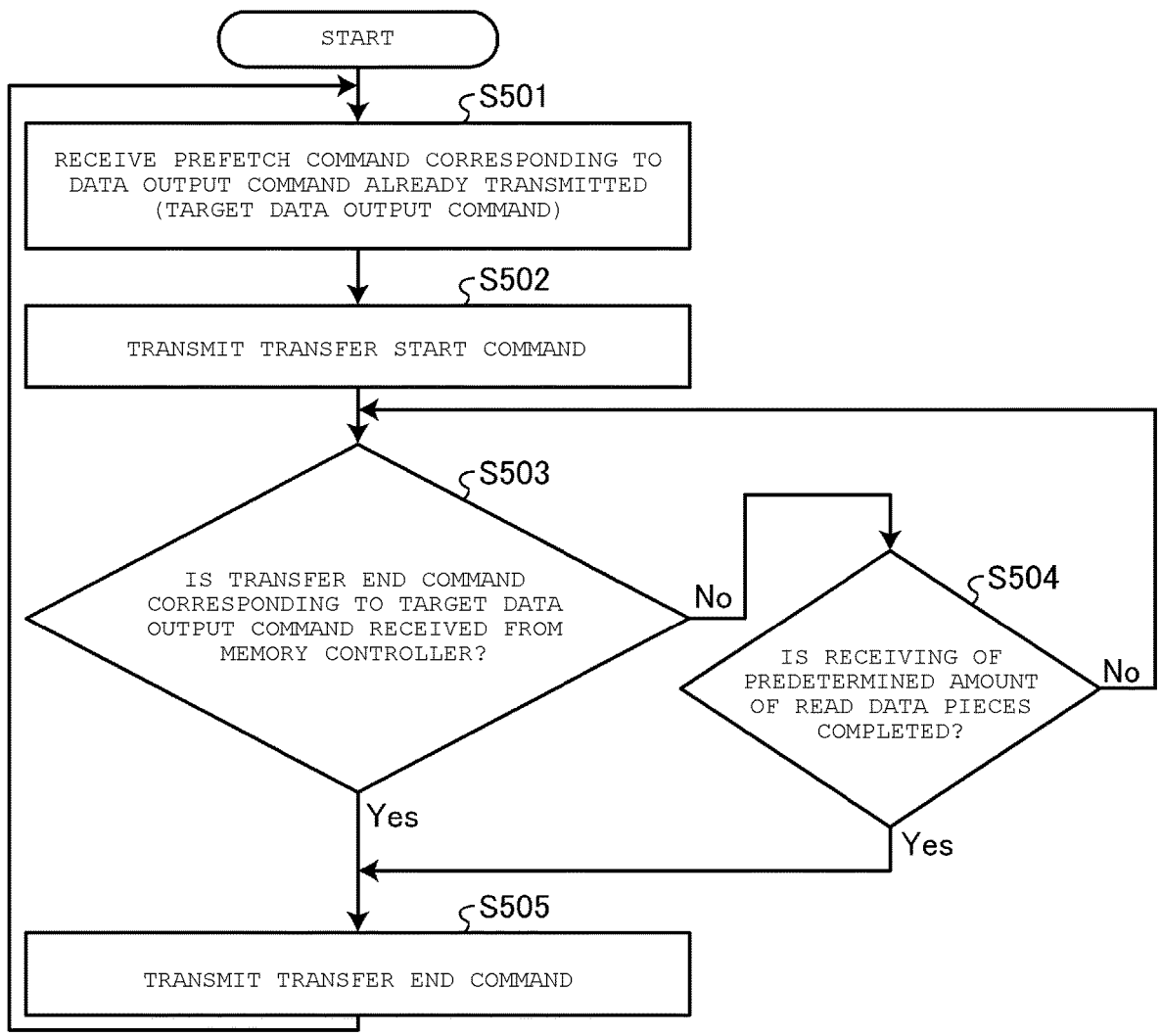
FIG. 12 is a flowchart illustrating an example of an operation of transmitting a transfer start command and a transfer end command by the bridge chip of the second embodiment.

FIG. 12 is a flowchart illustrating an example of the operation of transmitting the transfer start command Cs and the transfer end command Ct by the bridge chip BC of the second embodiment. It is noted that a series of the operations illustrated in FIG. 12 is individually executed for each memory channel MCH. In FIG. 12, the operation related to the certain memory channel MCH (denoted as a target memory channel MCH) will be described.

The controller 103 receives the prefetch command Cpf corresponding to the certain data output command Cdo (denoted as a target data output command Cdo) that has already been transmitted via the target memory channel MCH (S501). The controller 103 transmits the transfer start command Cs corresponding to the target data output command Cdo according to the prefetch command Cpf (S502).

Then, the controller 103 executes the same processes as S207 to S209 illustrated in FIG. 8 in S503 to S505, and executes the process in S501 again.

As described above, according to the second embodiment, when the bridge chip BC receives the prefetch command Cpf before the reception of the transfer start command Cs from the memory controller MC, the controller 103 transmits the command Cs to the memory chip CP according to the prefetch command Cpf.

Therefore, similarly to the first embodiment, during the period overlapping a portion or all of the period during which the read data pieces output from the memory chip CP connected to a certain memory channel MCH are input to the buffer memory 121, the read data pieces output from the memory chip CP connected to another memory channel MCH can be input to the buffer memory 121. Accordingly, the data transfer efficiency is improved compared to the comparative example.

Further, according to the second embodiment, as described with reference to FIGS. 10 and 12, the bridge chip BC can perform the reception operation for the read data strings in the order different from the reception order of the plurality of data output commands Cdo. Therefore, the memory controller MC can instruct the bridge chip BC to output the read data pieces in the order different from the reception order of the plurality of data output commands Cdo.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor device comprising:
   a first interface with a first channel through which data is to be transferred at a first data transfer rate;
   a second interface with a second channel through which data is to be transferred at a second data transfer rate slower than the first data transfer rate;
   a transfer circuit; and
   a processor configured to:
      in response to the first interface receiving a first data output command from a memory controller via the first channel, issue the first data output command for transmission via the second channel, in response to which a first memory chip connected to the second interface reads first data corresponding to the first data output command; and
      after a first predetermined amount of time has elapsed from the issuance of the first data output command, issue a first transfer start command via the second channel, in response to which the first data is transferred to the transfer circuit via the second channel.

2. The semiconductor device according to claim 1, wherein the first data in the transfer circuit becomes ready to be transferred via the first channel after a second predetermined amount of time has elapsed from the issuance of the first transfer start command, and
   the processor is configured to transfer the first data in the transfer circuit via the first channel, in response to the first interface receiving a transfer start command corresponding to the first data via the first channel, if the first data in the transfer circuit is ready to be transferred via the first channel.

3. The semiconductor device according to claim 1, wherein the processor is configured to:
   in response to the first interface receiving a second data output command from the memory controller via the first channel, issue the second data output command for transmission via the second channel, in response to which a second memory chip connected to the second interface reads second data corresponding to the second data output command; and
   at later of when i) the first predetermined amount of time has elapsed from the issuance of the second data output command, or ii) a third predetermined amount of time has elapsed from completion of transferring the first data to the transfer circuit, issue a second transfer start command via the second channel, in response to which the second data is transferred to the transfer circuit via the second channel.

4. The semiconductor device according to claim 3, wherein the transfer of the first data to the transfer circuit via the second channel and the transfer of the second data to the transfer circuit via the second channel are performed in series.

5. The semiconductor device according to claim 3, further comprising:
   a third interface with a third channel through which data is to be transferred at a third data transfer rate slower than the first data transfer rate, wherein
   the processor is configured to:
      in response to the first interface receiving a third data output command from the memory controller via the first channel, issue the third data output command for transmission via the third channel, in response to which a third memory chip connected to the third interface reads third data corresponding to the third data output command; and
      after the first predetermined amount of time has elapsed from the issuance of the third data output command, issue a third transfer start command, in response to which the third data is transferred to the transfer circuit via the third channel.

6. The semiconductor device according to claim 5, wherein when the processor issues the third transfer start command during the transfer of the first data to the transfer circuit via the second channel, the transfer of the first data to the transfer circuit via the second channel and the transfer of the third data to the transfer circuit via the third channel are performed in parallel.

7. The semiconductor device according to claim 6, wherein the transfer of the first data via the first channel and the transfer of the third data via the first channel are performed in series.

8. The semiconductor device according to claim 5, wherein when the first interface receives the first, third, and second data output commands in this order, the transfer of the first data via the first channel, the transfer of the third data via the first channel, and the transfer of the second data via the first channel are performed in this order.

9. A semiconductor storage device comprising:
   the semiconductor device according to claim 1; and
   a plurality of memory chips, which includes the first memory chip, connected to the second interface.

10. A memory system comprising:
    the semiconductor storage device according to claim 9; and
    the memory controller.

11. A semiconductor device comprising:
    a first interface with a first channel through which data is to be transferred at a first data transfer rate;
    a second interface with a second channel through which data is to be transferred at a second data transfer rate slower than the first data transfer rate;
    a transfer circuit; and
    a processor configured to:
       in response to the first interface receiving a first data output command from a memory controller via the first channel, issue the first data output command for transmission via the second channel, in response to which a first memory chip connected to the second interface reads first data corresponding to the first data output command; and in response to the first interface receiving a first prefetch command from the memory controller via the first channel, issue a first transfer start command via the second channel, in response to which the first data is transferred to the transfer circuit via the second channel.

12. The semiconductor device according to claim 11, wherein the first data in the transfer circuit becomes ready to be transferred via the first channel after a second predetermined amount of time has elapsed from the issuance of the first transfer start command, and the processor is configured to transfer the first data in the transfer circuit via the first channel, in response to the first interface receiving a transfer start command corresponding to the first data via the first channel, if the first data in the transfer circuit is ready to be transferred via the first channel.

13. The semiconductor device according to claim 11, wherein the processor is configured to, in response to the first interface receiving a second data output command from the memory controller via the first channel, issue the second data output command for transmission via the second channel, in response to which a second memory chip connected to the second interface reads second data corresponding to the second data output command; and in response to the first interface receiving a second prefetch command from the memory controller via the first channel, issue a second transfer start command for transmission via the second channel, in response to which the second data is transferred to the transfer circuit via the second channel.

14. The semiconductor device according to claim 13, wherein the transfer of the first data to the transfer circuit via the second channel and the transfer of the second data to the transfer circuit via the second channel are performed in series.

15. The semiconductor device according to claim 13, further comprising:

a third interface with a third channel through which data is to be transferred at a third data transfer rate slower than the first data transfer rate, wherein the processor is configured to:

in response to the first interface receiving a third data output command from the memory controller via the first channel, issue the third data output command for transmission via the third channel, in response to which a third memory chip connected to the third interface reads third data corresponding to the third data output command; and in response to the first interface receiving a third prefetch command from the memory controller via the first channel, issue a third transfer start command for transmission via the third channel, in response to which the third data is transferred to the transfer circuit via the third channel.

16. The semiconductor device according to claim 15, wherein when the processor issues the third transfer start command during the transfer of the first data to the transfer circuit via the second channel, the transfer of the first data to the transfer circuit via the second channel and the transfer of the third data to the transfer circuit via the third channel are performed in parallel.

17. The semiconductor device according to claim 16, wherein the transfer of the first data via the first channel and the transfer of the third data via the first channel are performed in series.

18. The semiconductor device according to claim 15, wherein when the first interface receives the first, second, and third data output commands in this order, the transfer of the first data via the first channel, the transfer of the third data via the first channel, and the transfer of the second data via the first channel are performed in this order.

19. A semiconductor storage device comprising:

the semiconductor device according to claim 11; and a plurality of memory chips, which includes the first memory chip, connected to the second interface.

20. A memory system comprising:

the semiconductor storage device according to claim 19; and the memory controller.

* * * * *